US012580636B2

(12) United States Patent
Kalhan

(10) Patent No.: US 12,580,636 B2
(45) Date of Patent: *Mar. 17, 2026

(54) SELECTION OF DECODING LEVEL AT SIGNAL FORWARDING DEVICES

(71) Applicant: Kyocera Corporation, Kyoto (JP)

(72) Inventor: Amit Kalhan, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 233 days.

This patent is subject to a terminal disclaimer.

(21) Appl. No.: 17/964,212

(22) Filed: Oct. 12, 2022

(65) Prior Publication Data

US 2023/0033208 A1     Feb. 2, 2023

Related U.S. Application Data

(63) Continuation of application No. 15/772,211, filed as application No. PCT/US2016/059522 on Oct. 28, 2016, now Pat. No. 11,509,387.

(60) Provisional application No. 62/248,459, filed on Oct. 30, 2015.

(51) Int. Cl.
| | |
|---|---|
| *H04B 7/155* | (2006.01) |
| *H04B 17/336* | (2015.01) |
| *H04L 5/00* | (2006.01) |
| *H04L 25/02* | (2006.01) |
| *H04W 88/10* | (2009.01) |

(52) U.S. Cl.
CPC ....... *H04B 7/15557* (2013.01); *H04B 17/336* (2015.01); *H04L 5/0048* (2013.01); *H04L 25/0204* (2013.01); *H04W 88/10* (2013.01)

(58) Field of Classification Search
CPC . H04B 7/15557; H04B 17/336; H04L 5/0048; H04L 25/0204; H04W 88/10
See application file for complete search history.

(56) References Cited

U.S. PATENT DOCUMENTS

| | | | |
|---|---|---|---|
| 9,917,628 B2 * | 3/2018 | Liang .................. | H04B 7/0452 |
| 2007/0190934 A1 | 8/2007 | Kim et al. | |
| 2007/0297498 A1 | 12/2007 | Kramer | |
| 2008/0144522 A1 * | 6/2008 | Chang ................ | H04B 7/15542 |
| | | | 370/252 |

(Continued)

OTHER PUBLICATIONS

Chen Luo, Yi Wu, Zesong Fei, Erik G. Larsson, and Jingming Kuang; "Adaptive Partial Decode-and-Forward Relaying with Quantized Feedback"; May 15-18, 2011; 2011 IEEE 73rd Vehicular Technology Conference (VTC Spring); Budapest, Hungary.

*Primary Examiner* — Saad A. Waqas

(57) ABSTRACT

In response to an instruction received from a base station, a signal forwarding device applies a signal forwarding scheme selected from a plurality of signaling forwarding schemes by a scheduler. The signal forwarding scheme may be applied by the signal forwarding device to forward signals from the base station to a user equipment (UE) device and/or from the UE device to the base station. The scheduler selects the signal forwarding scheme based on channel characteristics of the channel between the signal forwarding device and the UE device and/or the channel between the signal forwarding device and the base station. Although at least some of the channel characteristics are determined by the base station, at least some of the channel characteristics can be determined by the signal forwarding device in some situations.

9 Claims, 7 Drawing Sheets

(56)     References Cited

U.S. PATENT DOCUMENTS

| | | | |
|---|---|---|---|
| 2010/0035541 A1 | 2/2010 | Kim et al. | |
| 2010/0111018 A1* | 5/2010 | Chang ................ | H04B 7/15585 |
| | | | 370/329 |
| 2010/0265872 A1* | 10/2010 | Wu ....................... | H04W 16/26 |
| | | | 370/315 |
| 2011/0110284 A1* | 5/2011 | Wu ....................... | H04L 1/0001 |
| | | | 370/312 |
| 2011/0273999 A1* | 11/2011 | Nagaraja ............... | H04L 1/1692 |
| | | | 370/252 |
| 2012/0093061 A1* | 4/2012 | Charbit ................. | H04L 1/0034 |
| | | | 370/315 |
| 2014/0022982 A1* | 1/2014 | Kim ..................... | H04L 1/0077 |
| | | | 370/315 |
| 2014/0334392 A1* | 11/2014 | Gage .................... | H04L 5/0092 |
| | | | 370/329 |
| 2015/0043423 A1* | 2/2015 | Hadef ................. | H04W 72/542 |
| | | | 370/315 |
| 2015/0195033 A1* | 7/2015 | Maric .................. | H04W 40/12 |
| | | | 455/418 |
| 2017/0093541 A1* | 3/2017 | Pan ....................... | H04W 72/23 |

* cited by examiner

SELECTION OF DECODING LEVEL AT SIGNAL FORWARDING DEVICES

CLAIM OF PRIORITY

The present application is a continuation of U.S. application Ser. No. 15/772,211, filed Apr. 30, 2018 and entitled "SELECTION OF DECODING LEVEL AT SIGNAL FORWARDING DEVICES"; which is a national stage application of PCT/US2016/059522, filed Oct. 28, 2016 and entitled "SELECTION OF DECODING LEVEL AT SIGNAL FORWARDING DEVICES"; which claims priority to Provisional Application No. 62/248,459, entitled "RELAY SCHEME SELECTION BASED ON PILOT SIGNALS TRANSMITTED BY THE RELAY AND THE USER EQUIPMENT," filed Oct. 30, 2015, all assigned to the assignee hereof and hereby expressly incorporated by reference in their entirety.

FIELD

This invention generally relates to wireless communications and more particularly to selecting a level of decoding at signal forwarding devices.

BACKGROUND

Some communication systems utilize a signal forwarding device, such as a repeater station, relay station or a self-backhauled station to facilitate the transfer of information between user equipment (UE) devices and a core network. The signal forwarding device is typically not connected directly to the core network but still provides service to the UE devices by forwarding information to and from the UE devices and a base station which is connected to the core network. Where the signal forwarding device is a repeater, the repeater simply retransmits downlink signals received from another base station to the UE device and retransmits uplink signals received from the UE device to the other base station. Although the repeater may apply limited signal processing to the incoming signal such as filtering, frequency shifting, and amplification, a repeater will not decode the incoming signal that is to be forwarded. Relay stations and self-backhaul stations perform at least some signal processing before retransmitting the information. Such processing can vary from partial decoding to complete decoding of the incoming signal. For example, the incoming signal can be completely decoded and used to generate a new signal or the incoming signal may not be completely decoded but still used to transmit the forwarded outgoing signal. Some of the various levels of processing (forwarding techniques) are sometimes referred to as amplify and forward (AF), partial decoding and forward (PDF) and decode and forward (DF) schemes.

SUMMARY

In response to an instruction received from a base station, a signal forwarding device applies a signal forwarding scheme selected from a plurality of signaling forwarding schemes by a scheduler. The signal forwarding scheme may be applied by the signal forwarding device to forward signals from the base station to a user equipment (UE) device and/or from the UE device to the base station. The scheduler selects the signal forwarding scheme based on channel characteristics of the channel between the signal forwarding device and the UE device and/or the channel between the signal forwarding device and the base station. In accordance with one exemplary technique, the channel characteristics are determined at least from a reference signal received and retransmitted by the signal forwarding device and a reference signal transmitted by the signal forwarding device. In accordance with another exemplary technique, at least some of the channel conditions are determined by the signal forwarding device and conveyed to the scheduler through the base station.

DETAILED DESCRIPTION

As discussed above, communication systems often employ repeaters, relays and self-anchored base stations to forward signals transmitted between base stations and the UE devices served by the base stations. Signals may be forwarded from the base station to the UE device, from the UE device to the base station or both. In conventional systems, the signal forwarding device (repeater, relay, etc.) typically only performs one type of signal forwarding scheme. For example, the signal forwarding device may be a repeater where signals are retransmitted with no decoding of the incoming signal. In other situations, the signal forwarding device may be a relay where the incoming signal is at least partially decoded and used to generate the forwarded signal. In the examples discussed herein, however, the signal forwarding device is able to apply any one of a plurality of signal forwarding schemes where the applied scheme is selected by a scheduler. The scheduler may be part of, or connected to, the base station where the base station sends an instruction that indicates the selected signal forwarding scheme to the signal forwarding device. The channel characteristics may be determined by the base station, the signal forwarding device, or both.

The channel characteristics between the UE device and the signal forwarding device are continually changing due to the mobility of the UE device and/or changes in the interference level due to traffic-load. In other scenarios, the signal forwarding device might be mobile and the channel characteristics between the signal forwarding device and the base station are also changing. Since, all these conditions could impact the channel capacity of each link it is beneficial if the signal forwarding schemes are adaptive to such changes. For example, when the UE device is very close to the signal forwarding device, the received SNR of the UE device signal at the signal forwarding device receiver allows the signal forwarding device to decode the signal with a low bit error rate (BER).

Figure 1:
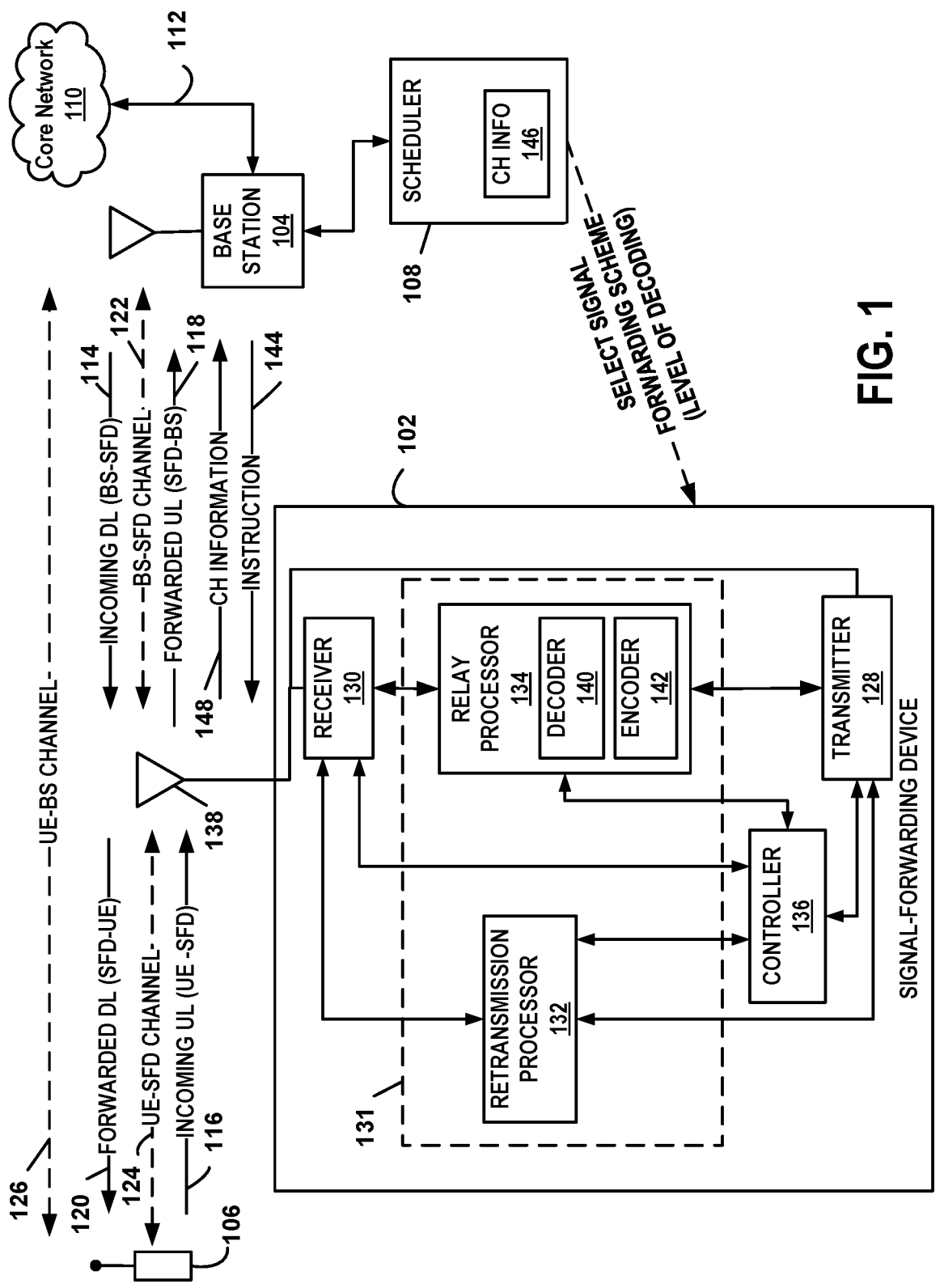
FIG. 1 is a block diagram of a wireless communication system including a signal forwarding device and a base station.

FIG. 1 is a block diagram of a wireless communication system 100 including a signal forwarding device 102 and a base station 104. The base station 104 provides wireless communication service to one or more user equipment (UE) devices 106 where the base station 104 exchanges wireless signals directly with the UE device 106 or through the signal forwarding device 102. For the examples herein, a scheduler 108 assigns communication resources for serving the UE device 106 as well as performing the functions for selecting the signal forwarding scheme to be used by the signal forwarding device 102. The base station 104 is connected to a core network 110 through a backhaul 112 in accordance with known techniques. The scheduler 108 may be part of the base station 104 or may be connected to the base station 104, either directly or through the core network 110. Although other techniques may be used, the backhaul 112 is typically a wired backhaul that may include cabling, wires, fiber optic cables, and electronic equipment. Some other suitable backhaul techniques include wireless links such as microwave point-to-point links, optical laser links, and other wireless connections that may use standard or proprietary protocols.

The signal forwarding device 102 is any fixed, mobile, or portable equipment that preforms the functions described herein. For example, the signal forwarding device 102 may be a fixed device or apparatus that is installed at a particular location at the time of system deployment. Examples of such equipment include fixed base stations or fixed transceiver stations. In some situations, the signal forwarding device 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the signal forwarding device 102 may be a portable device that is not fixed to any particular location. Accordingly, the signal forwarding device 102 may be a portable user device such as UE device in some circumstances. In some implementations, the signal forwarding device 102 may be a base station, eNB, or access point that performs signal forwarding functions in addition to serving UE devices. For example, a self-backhauled eNB may be configured to perform signal forwarding functions for some UE devices in addition to directly serving other UE devices utilizing the wireless backhaul to the base station 104.

The base station 104 provides wireless communication service to one or more UE devices 106 by receiving uplink signals and transmitting downlink signals to the UE devices. For the example of FIG. 1, the signal forwarding device 102 forwards the downlink signals 114 to the UE device 106 and forwards the uplink signals 116 to the base station 104. Therefore, the UE device 106 transmits an incoming UE uplink signal 116 that is received and forwarded by the signal forwarding device 102 as a forwarded uplink signal 118. The signal forwarding device 102 receives incoming downlink signals 114 transmitted by the base station 104 and forwards a forwarded downlink signal 120 to the UE device 106 that is based on the incoming downlink signal 114. The forwarded uplink signal 118 and the incoming downlink signal 114 are transmitted within a base-station-to-signal forwarding-device channel (BS-SFD channel) 122. For the examples herein, the BS-SFD channel 122 is within a single frequency band although different sub-bands may be used for uplink and downlink directions. The forwarded downlink signal 120 and the incoming uplink signal 116 are transmitted within a UE-to-signal forwarding-device channel (UE-SFD channel) 124. For the examples herein, the UE-SFD channel 124 is within a single frequency band although different sub-bands may be used for uplink and downlink directions. Any combination of frequency bands and frequency sub-bands may be used for the channels. In addition to the channels that link through the signal forwarding device 102 and under the appropriate conditions, the base station 104 can communicate with the UE device 106 directly through a direct channel 126 for uplink transmissions, downlink transmissions, or both. As a result, the signal forwarding device 102 may only forward signals in either the uplink or downlink direction in some situations.

The signal forwarding device 102 is capable of applying any one of a plurality of signal forwarding schemes when forwarding a signal. As discussed herein, a signal forwarding scheme is based on the parameters, techniques, and/or level of processing applied to the incoming signal to generate the forwarded signal. The number and types of signal forwarding schemes that a signal forwarding device 102 is capable of applying depends on the particular implementation. For the examples herein, the signal forwarding schemes are categorized into three basic groups where each group includes at least one scheme. Repeater signal forwarding schemes generally include retransmission schemes where the incoming signal is received and retransmitted. At a minimum, the incoming signal is amplified and retransmitted as the forwarded signal. In some repeater schemes, some processing is applied to the incoming signal. For example, the incoming signal may also be filtered and/or frequency shifted. Generally, however, the incoming signal is not demodulated or decoded in a repeater signal forwarding scheme. Repeater schemes are sometimes referred to as amplify and forward (AF) schemes. Relay signal forwarding schemes include at least some decoding of the incoming signal to create the forwarded signal where the level of decoding can range from minimal to complete decoding of the incoming signal. Complete decoding includes fully decoding the incoming signal to extract the payload and then applying the decoded data to generate the new forwarded signal. Complete decoding schemes are sometimes referred to as decode and forward (DF) schemes. Several proposed techniques include partial decoding of the incoming signal to transmit a forwarded signal without complete decoding to extract the data from the signal. For partial decoding, the incoming signal may be demodulated to obtain the raw demodulated symbols which are modulated and retransmitted. These schemes are sometimes referred to as partial decode and forward (PDF) schemes. Accordingly, the signal forwarding device 102 may be capable of applying any number of signal forwarding schemes categorized as AF, PDF and DF schemes. In some situations, the signal forwarding device 102 is capable of applying at least one scheme of each category. In other situations, the signal forwarding device 102 may only apply schemes from a single group. For example, the signal forwarding device may only be capable of applying several different PDF schemes. For a particular example discussed herein, however, the signal forwarding device 102 is capable of applying at least one AF scheme, one PDF scheme and one DF scheme. In addition, different signal forwarding schemes can be applied to uplink and downlink directions for a particular UE device 106.

For the example of FIG. 1, the signal forwarding device 102 includes a transmitter 128, receiver 130, a signal forwarding processor 131, retransmission processor 132, relay processor 134, controller 136 and antenna 138 as well as other electronics, hardware, and code. The various functions and operations of the blocks described with reference to the signal forwarding device 102 may be implemented in any number of devices, circuits, or elements. Two or more of the functional blocks may be integrated in a single device, and the functions described as performed in any single device may be implemented over several devices. For example, the controller 138 may perform functions of the signal forwarding processor 131, retransmission processor 132 or relay processor 134 in some circumstances. The controller 136 includes any combination of hardware, software, and/or firmware for executing the functions described herein as well as facilitating the overall functionality of the signal forwarding device 102. An example of a suitable controller 136 includes code running on a microprocessor or processor arrangement.

The transmitter 128 includes electronics configured to transmit wireless signals to UE devices 108 as well as to the base station 104. In some situations, the transmitter 128 may include multiple transmitters. The receiver 130 includes electronics configured to receive wireless signals from UE devices as well as from the base station 104. In some situations, the receiver 130 may include multiple receivers. The receiver 130 and transmitter 128 receive and transmit signals, respectively, through an antenna 138. The antenna 138 may include separate transmit and receive antennas. In some circumstances, the antenna 138 may include multiple transmit and receive antennas. The transmitter 128 and receiver 130 in the example perform radio frequency (RF) processing. The receiver 130 in the example, therefore, may include components such as low noise amplifiers (LNAs), and filters. The transmitter 130 may include filters and amplifiers. In some situations, the transmitter and/or receiver may also include a signal mixer. Other components may include isolators, matching circuits, and other RF components.

The signal forwarding processor 131 includes electronics for performing signal forwarding functions to generate the forwarded signal. The signal forwarding processor 131 is capable of applying at least two different signal forwarding schemes to the received signal. In some implementations, the signal forwarding processor 131 is capable of applying any one of a number signal forwarding schemes where each scheme includes a different level of decoding of the incoming signal. For the example discussed with reference FIG. 1, the signal forwarding processor 131 includes the retransmission processor 132 and the relay processor 134. In some situations, the signal forwarding processor 131 may include only the relay processor 134. In such situations, the relay processor 134 is capable of applying at least two signal forwarding schemes including different levels of decoding which may include decoding for PDF and/or DF signal forwarding schemes. For example, the relay processor 134 may be capable of applying a PDF scheme and DF scheme.

The retransmission processor 132 includes electronics for performing signal forwarding functions that do not include decoding of the incoming signal. The retransmission processor 132, therefore, performs repeater type tasks where such tasks may include, for example, filtering and amplification. In some cases, the tasks may also include frequency shifting to shift the incoming signal from one frequency for transmission at another frequency. In response to, or in conjunction with, the controller 136, the retransmission processor 132 receives an incoming signal from the receiver and processes the signal for retransmission through the transmitter 128. The retransmitted signal is a forwarded downlink signal 120 where the incoming signal is an incoming downlink signal 114 transmitted from the base station 104. The retransmitted signal is an uplink forwarded signal 118 where the incoming signal is an incoming uplink signal transmitted by a UE device 108. The retransmission processor may have components that can be considered to be part of the receiver 130 and or transmitter 128. For example, at least some amplification of the retransmitted signal as part of the retransmission processor 132 processing may be performed by the transmitter 128. In some ways, the retransmission processor can be considered to be applying a signal forwarding scheme that has a level of decoding equal to zero.

The relay processor 134 includes a decoder 140 and an encoder 142 and is any circuit, combination of circuits, or device that can process the incoming signal to generate the forwarded signal beyond merely retransmitting the incoming signal. For the examples herein, the relay processor 134 is capable of performing a complete decode and forward (DF) scheme and at least one partial decode and forward (PDF) scheme. In some situations, however, the relay processor 134 may be capable of performing numerous PDF schemes. In response to, or in cooperation with, the controller 136, the relay processor 134 processes the incoming signal to generate a forwarded signal in accordance with the selected relay scheme. As a result, the controller selects the appropriate PDF scheme or DF scheme to manage the relay processing function.

For the examples herein, the controller 136 selects the signal forwarding scheme based on a signal forwarding scheme selection instruction 144 provided by the base station serving the UE device for which signals are forwarded. Based at least partly on channel information 146, the scheduler 108 selects the signal forwarding scheme that should be used by the signal forwarding device 102. In one example, the signal forwarding device 102 provides the base station 104 with at least some of the channel information 148. The channel information 142, however, may include any combination of channel measurements made by the signal forwarding device 102, channel measurements made by the base station 104, channel quality indicators provided by the signal forwarding device 102, and/or channel estimation.

In some situations, the channel information 148 provided by the signal forwarding device 102 is a forwarded reference signal received from the UE device 106. In still other situations, the channel information 148 is a threshold indicator indicating whether the quality of channel is above a threshold. In one example, the base station 102 uses channel estimation and evaluation techniques to evaluate a reference signals received and retransmitted by the signal forwarding device 102.

Figure 2:
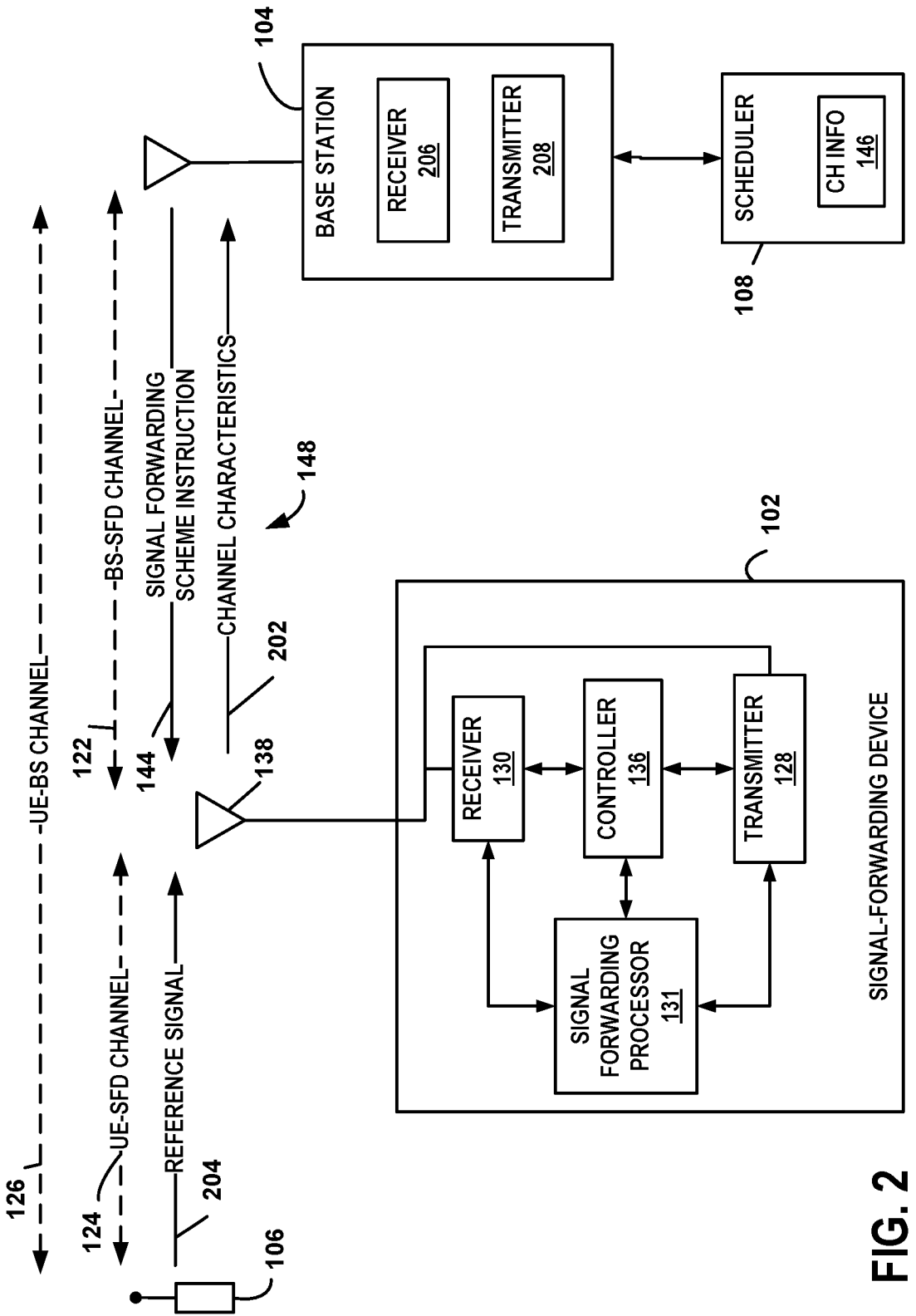
FIG. 2 is a block diagram of a wireless communication system for an example where the channel information transmitted by the signal forwarding device includes channel characteristics.

FIG. 2 is a block diagram of communication system 100 for an example where the channel information 148 transmitted by the signal forwarding device 102 includes channel characteristics 202. In one example, the channel characteristics 202 include parameters or other indicators that are indicative of channel measurements taken by the signal forwarding device 102. In another example, channel characteristics 202 include one or more indicators indicating whether a measurement or another parameter is above or below a threshold. In some situations, the indicator may indicate whether the quality of a particular channel is above a threshold.

For the examples of FIG. 2, the signal forwarding device 102 receives a reference signal 204 from the UE device 106. A pilot signal is an example of a suitable reference signal 204. The signal forwarding device 102 processes the reference signal 204 to measure one or more channel characteristics of the channel (UE-SFD) 124 between the signal forwarding device 102 and the particular UE device 106. For the examples, the controller 136 is configured to process the reference signal 204 in cooperation with the receiver 130 to determine the channel measurements. Examples of suitable measurements include signal to noise ratio (SNR), received signal strength, signal-to-interference-plus-noise ratio (SINR) where SINR is typically preferred.

As mentioned above, the resulting channel measurements can be sent to the base station 102 as the channel characteristics 202. In some situations, the channel measurements are processed further by the controller 136 to generate other parameters based on the measurements. As described above, such a parameter may be an indicator indicating whether the quality of the channel is above a threshold.

The channel characteristics 202 can be sent using a data channel or control channel. In one example, the channel characteristics 202 is sent to the base station from the signal forwarding device 102 in a wireless channel. In some situations, the BS-SFD CH channel is used to transmit the instructions. In other situations, the instruction is transmitted over a separate wireless channel such as a point-to-point microwave link. Accordingly, any suitable channel may be used to transmit the instructions.

In some situations, the signal forwarding device 102 forwards a scheduling request received from the UE device to the base station in a data channel. In these situations, the associated control channel contains an indicator field indicating the channel condition of the UE-SFD channel. In other situations, the signal forwarding device 102 sends a message to the bases station 104 requesting a resource for the UE device transmission. This request includes the channel conditions.

A receiver 206 in the base station 104 receives the channel characteristics information 202 and forwards the information to the scheduler 108. The scheduler 108 evaluates the channel characteristics 202, and possibly other channel information, to select signal forwarding scheme to be used by the signal forwarding device 102. Other channel information 146 available to the scheduler 108 may include the channel quality of channel characteristics of the direct channel (UE-BS channel) 126 between the UE device 106 and the base station 104. The selection may be based on several parameters or information in addition to the channel information 148. Some examples of data that may be evaluated by the scheduler 108 to select the scheme include processing latency at the signal forwarding device, the required quality of service (QoS) for the link to the UE device, available capacity at the base station 102, and available coding rates supported by the base station. Each of the factors may be weighted with different importance in selecting the signal forwarding scheme. For example, in some situations, the processing latency at the signal forwarding device may be the highest priority in selecting the signal forwarding scheme. Where the signal forwarding scheme requires decoding of the incoming signal, several decoding iterations (Turbo decoder) to decode the signal which may require tens or hundreds of microseconds. Accordingly, the selection of the signal forwarding scheme typically involves a trade-off between high reliability and the latency of the retransmission of the signal. High reliability is achieved where the signal forwarding scheme decodes the signal completely and then transmits at the cost of higher latency. The scheduler 108 may select the same signal forwarding scheme for the uplink signal forwarding and the downlink signal forwarding or may select different schemes for each direction. In some situations, the scheduler 108 may select a signal forwarding scheme for the signal forwarding device 102 to use in one direction and may schedule resources for direct communication through the UE-BS CH 126 for the other direction.

A transmitter 208 in the base station 104 forwards the information regarding the selected signal forwarding scheme to the signal forwarding device 102 in the signal forwarding scheme instruction 144. The instruction 144 may be sent using any adequate communication channel. In one example, the signal forwarding scheme instruction is sent from the base station to the signal forwarding device 102 in a wireless channel. In some situations, the BS-SFD CH channel is used to transmit the instructions. In other situations, the instruction is transmitted over a separate wireless channel such as point to point microwave link. Accordingly, any suitable channel may be used to transmit the instructions. For example, the instruction 144 may be transmitted in a Physical Downlink Control Channel (PDDCH) message.

The signal forwarding device 102 receives the instruction 144 and, in response to the instruction 144, applies the selected signal forwarding scheme to the incoming signal(s). In response to the instruction, the controller 136 applies the selected signal forwarding scheme to the incoming signal by invoking the signal forwarding processor 131. Where the relay processor 134 is used for the signal forward processing, the controller 136 manages the relay processor 134 to apply the appropriate signal forwarding scheme and level of decoding/processing to the incoming signal (whether the incoming UL signal 116 or the incoming DL signal 114). For example, where the instruction indicates that the PDF scheme should be applied, the controller 136 manages or otherwise controls the relay processor 134 to apply the selected PFD scheme to the incoming signal and to generate the forwarded signal. As mentioned above, different signal forwarding schemes may be applied in the different directions.

Figure 3:
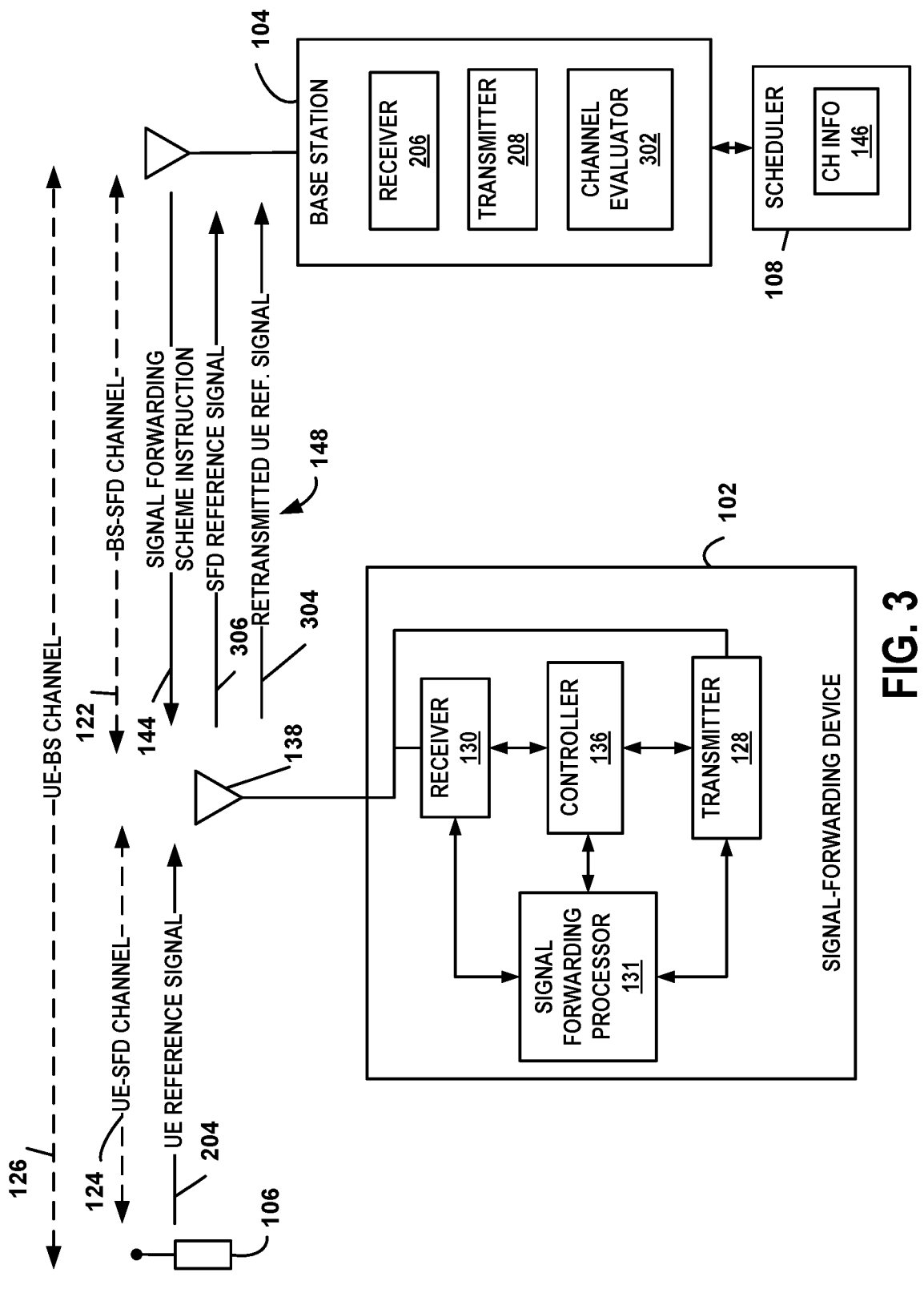
FIG. 3 is a block diagram of the wireless communication system for an example where the base station determines the channel information.

FIG. 3 is a block diagram of the communication system 100 for an example where the base station 104 determines the channel information 146. The base station includes a channel evaluator 302 that can obtain channel information for at least one of the channels involving the signal forwarding device 102. For the example of FIG. 3, the channel evaluator 302 is capable of determining channel characteristics for the BS-SFD channel 122, the UE-BS channel 126 and the UE-SFD channel 124. The UE device 106 transmits a UE reference signal 204 such as a pilot signal that is received by the signaling forwarding device 102. The signaling forwarding device 102 retransmits the received UE reference signal as a retransmitted UE reference signal 304.

The signal forwarding device also transmits is own reference signal 306. As discussed below, the technique for transmitting the retransmitted UE reference signal 304 and the SFD reference signal 306 typically depends on the type of communication channel. For example, in a system employing time division multiplexing (TDM) channels, the two reference signals 304, 306 can be transmitted at different times. In systems employing code division multiplexing (CDM) channels, the two channels 304, 306 can be coded and combined before transmission.

The base station 104 receives the retransmitted UE reference signal 304 and the SFD reference signal 306. The channel estimator 302 processes the signals and determines the channel characteristics for the UE-SFD channel 124 and the BS-SFD channel 122. For the example, the channel evaluator 302 also determines the channel characteristics of the direct UE-BS channel 126. Channel information 146 based on the channel characteristics are forwarded to the scheduler 108. Based on the channel information 146 and other factors, the scheduler 108 determines whether the signal forwarding device 102 should be used to forward signals and, if so, selects the signal forwarding scheme that should be used by the signal forwarding device 102. The scheduler 108 schedules communication resources and sends, through the base station 104, the scheduling information to the UE devices as well as sending the signal forwarding scheme instruction 144 to the signal forwarding device 102.

Figures 4, 5:
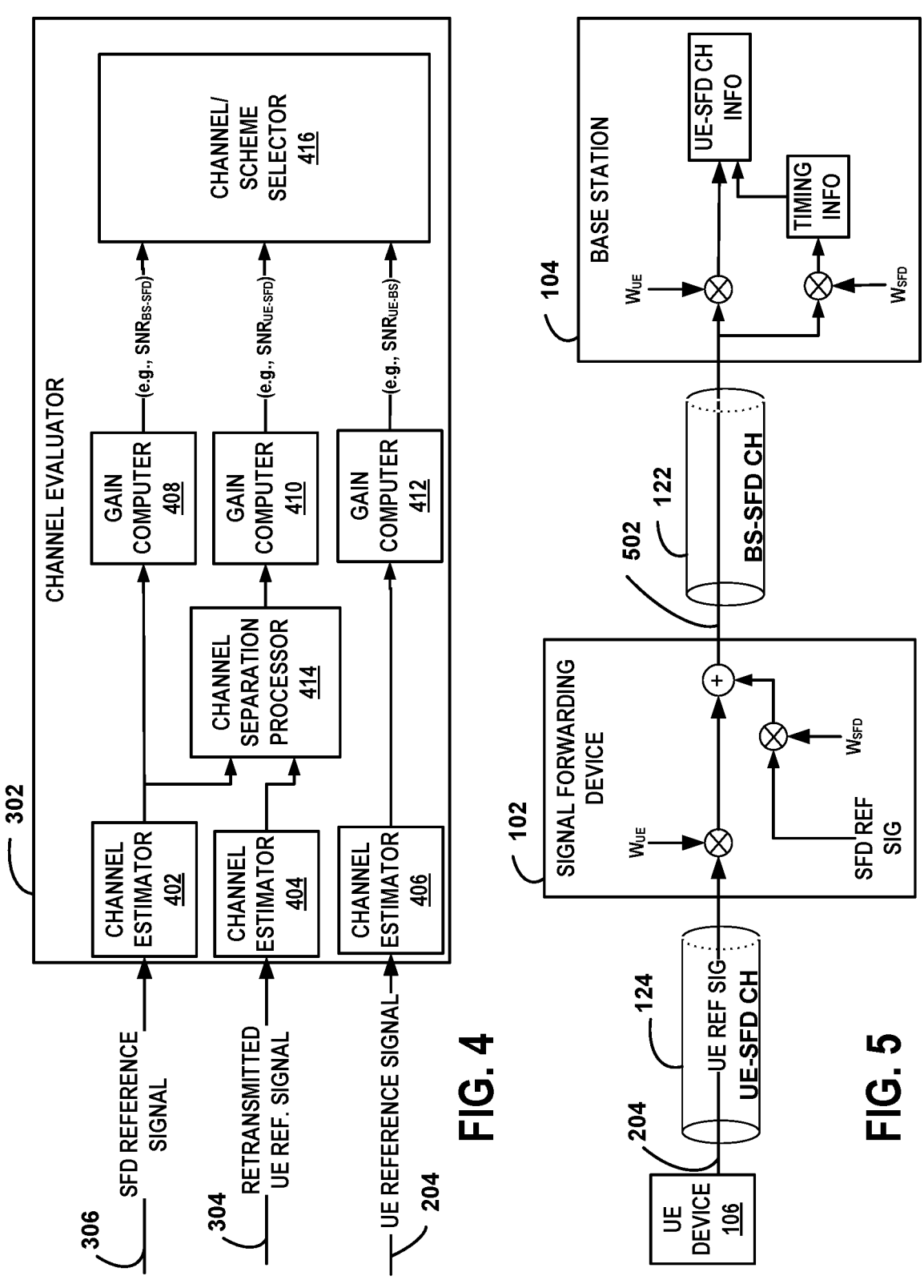
FIG. 4 is block diagram of an example of a channel evaluator suitable for use in the exemplary system described with reference to FIG. 3.
FIG. 5 is a block diagram of an example of where the retransmitted UE reference signal and the SFD reference signal are transmitted with code division multiplexing (CDM).

FIG. 4 is block diagram of an example of a channel evaluator 302 suitable for use in the exemplary system described with reference to FIG. 3. The channel evaluator 302 includes a channel estimation function that can be represented by channel estimators 402, 404, 406 and a gain computation function that can be represented by gain computers 408, 410, 412. One channel estimator 402 receives the SFD reference signal 306 through the BS-SFD channel 118 and provides channel coefficients based on measurements of the received SFD reference signal 306. The gain computer 408 evaluates the channel coefficients provided by the channel estimator 402 to compute the gain. The computed gain may be signal-to-noise ratio (SNR) or the signal-to-noise-plus-interference ratio (SNIR). Another channel estimator 406 receives the UE reference signal 204 through the UE-BS channel 126 and provides channel coefficients based on measurements of the received UE reference signal 204. The gain computer 412 evaluates the channel coefficients provided by the channel estimator 406 to compute the gain. The channel estimator 404 receives the retransmitted UE reference signal 304 through the BS-SFD channel 118. In situations where the channel evaluator is only determining whether to use the signal forwarding device 102, the gain computer 410 evaluates the channel estimates to compute the gain for the retransmitted UE reference signal. The gains computed by the gain computers 408, 410, 412 can be compared to determine whether communication should be directly with the UE device, through the signal forwarding device 102, or both. For situations where the signal forwarding scheme of the signal forwarding device 102 is selected, however, additional information regarding the UE-SFD channel 124 is used to make the determination. For the example of FIG. 4, a channel separation processor 414 uses the channel estimate of the BS-SFD channel 118 to determine characteristics of the UE-SFD channel 124. The channel separator may apply any single signal processing algorithm or combination of signal processing algorithms to separate the two channels. An example of a suitable technique includes using blind source separation (BSS) techniques. The channel separation processor 414 determines the channel characteristics of the UE-SFD channel. The channel coefficients of the UE-SF channel, for example can be determined. The gain computer 410 determines the gain for the UE-SFD channel 124. Based on the gains of the channels, the channel/scheme selector 416 determines whether the signal forwarding device should be used and, if so, what signal forwarding scheme should be used. The particular decision technique used by the channel/scheme selector 416 may be based on any of a variety of algorithms or decision criteria. The following decision technique and criteria provides one example.

For the example, the SNR of each channel is used to determine whether the signal forwarding device should be used and, if so, the SNR of each channel is compared to thresholds to select the signal forwarding scheme to be used by the signal forwarding device 102. If the SNRUE-SFD of UE-SFD channel 124 plus the SNRBS-SFD of BS-SFD channel 122 is greater than the SNRUE-BS of UE-BS channel 126, it is determined that the signal forwarding device 102 should be used. In some situations, the composite channel quality of UE-to-SFD+SFD-to-BS SNR is sufficient to determine if the SFD-to-BS link is fixed due to fixed locations of the relay and the base station. As a result, in some situations, the channel estimator 402, channel separator 414, and gain computer 408 can be omitted in determining whether the signal forwarding device should be used.

For the example, the signal forwarding device 102 is capable of applying three signal forwarding device schemes including an AF scheme, a DF scheme, and a PDF scheme. If the signal forwarding device is to be used, the criteria is applied to determine which scheme should be used. The criteria may include any number of factors and thresholds. Some examples of factors that can be used to select the signal forwarding scheme include the decoder's processing delay (for example, number of iterations for Turbo decoders) at the base station 104, the decoder's processing delay at the signal forwarding device 102 the quality of service (QoS) requirements of the transmission, the latency requirements of the transmission, and whether the signal forwarding device 102 is fixed or mobile. Specific thresholds may be determined using simulations typically depend on the particular implementation of the different system components. For example, the expected decoder delay at the signal forwarding device 102 may be considered when determining whether to use a PDF scheme. In one example, the DF scheme is used when the UE-SFD channel 124 is high quality and when the expected decoding delay can be tolerated to achieve the required latency for the transmission. In such an example, the AF scheme is used when the UE-SFD channel 124 is of somewhat high quality and the PDF is used when the UE-SFD channel 124 is of mid quality where the delay for full decoding cannot be tolerated to achieve the required latency for the transmission.

There are several options, however, for selecting the signal forwarding scheme depending upon different scenarios. For example, in some cases the UL transmission from the UE device is decoded at the signal forwarding device when the received signal SINR is strong enough for a successful early decoding (few decoding iterations). In this case, the DF scheme is appropriate. However, in another scenario, where the received signal SINR is not strong enough, it is preferred that the signal forwarding device not make an attempt to decode the signal because it may take a maximum number of iterations to decode. In this case, it might be better for the forwarding device to apply a PDF scheme and allow the base station to decode the signal. In addition to considering the received SINR, the QoS (latency) requirements may need to be considered such that it may be determined that the signal forwarding device should not delay the transmission by not even attempting to decode the transmission and should simply apply a PDF scheme.

Exemplary criteria with thresholds includes the following:

If threshold A<$SNR_{UE\text{-}SFD}$, then use DF scheme;

If threshold B<$SNR_{UE\text{-}SFD}$<threshold A, then use AF scheme;

If threshold C<$SNR_{UE\text{-}SFD}$<threshold B, and decoder delay at signal forwarding device can be tolerated to achieve latency requirement of transmission, then use DF scheme;

If threshold C<$SNR_{UE\text{-}SFD}$<threshold B, and decoder delay at signal forwarding device cannot be tolerated to achieve latency requirement of transmission, then use PDF scheme;

If $SNR_{UE\text{-}SFD}$<threshold C, then use DF scheme, where threshold A>threshold B>threshold C.

Therefore, for the above example, the DF scheme is used when the SNR of the UE-SFD channel is above a very high threshold, below a very low threshold, and at mid value where the decoding delay can be tolerated. The rationale for such a scheme selection technique may be based on the following. Where the EE-SFD channel quality is very high, the decoding delay at the signal forwarding device is very low and can be tolerated for all transmission. For example, where a Turbo decoder is used, the number of decoding iterations is relatively low because the symbols are of high quality with few errors. The DF scheme may also be needed where the channel quality is sufficiently low that full decoding at the signal forwarding device is necessary to ensure a minimum error rate at the destination (e.g., base station). Where the channel quality is still relatively high but less than the highest threshold, the AF scheme may be sufficient to forward the signal and maintain the minimum error rate at the destination (e.g., base station).

At a midrange quality of the UE-SFD channel, the DF scheme can be used where the resulting decoding delay can be tolerated. Otherwise, a PDF scheme may be used where the signal forwarding device demodulates and forwards the detected symbols without decoding the incoming signal. This results in a compromise between quality of the forwarded signal and the resulting latency.

FIG. 5 is a block diagram of an example of where the retransmitted UE reference signal and the SFD reference signal are transmitted with code division multiplexing (CDM). As mentioned above, in system using CDM, the retransmitted UE reference signal and the SFD reference signal can be coded (scrambled) and then transmitted at the same time. For the example of FIG. 5, the UE reference signal is received at the signal forwarding device and coded with a UE scrambling code (such as a Walsh code). The SFD reference signal is coded with a SFD scrambling code (such as another Walsh code) and then combined with the coded UE reference signal. The combined coded signal is transmitted over the BS-SFD channel 122 to the base station 104. At the base station 104, the UE scrambling code and the SFD scrambling code are applied to the incoming combined reference signal 502. The application of the SFD scrambling code allows recovery of the SFD reference signal. After applying the UE scrambling code to the incoming combined reference signal 502, timing derived from the recovered SFD reference signal is applied to the resulting decoded signal. Channel estimation and gain computation is performed on the resulting signal.

Figure 6:
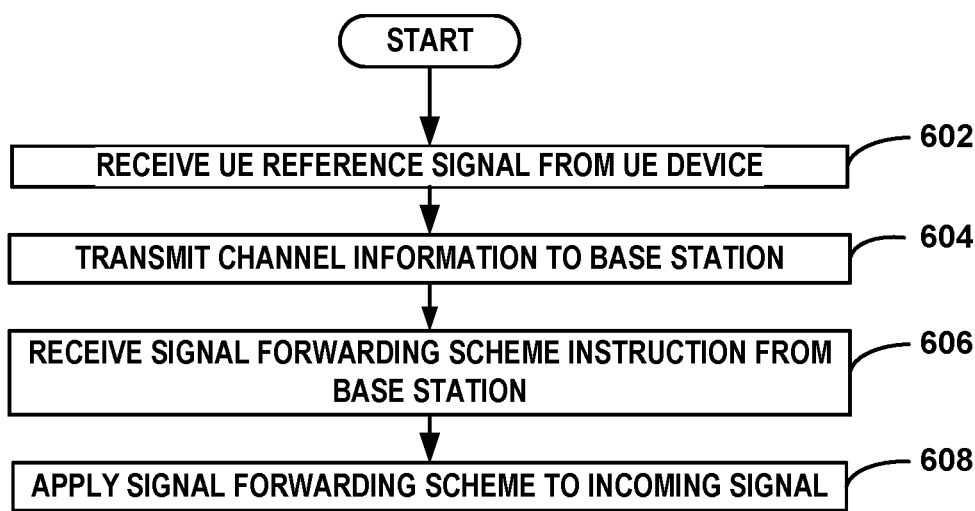
FIG. 6 is a flow chart of an example of a method of managing signal forwarding schemes at a signal forwarding device.

FIG. 6 is a flow chart of an example of a method of managing signal forwarding schemes at a signal forwarding device 102. Although the method may be performed by other types of devices and in different systems, for the example, the method is performed in the signal forwarding device 102 described above.

At step 602, a UE reference signal 204 is received from the UE device 106. An example of a suitable UE reference signal 204 is a pilot signal. The reference signal 204 is received through the UE-SFD channel 124.

At step 604, channel information 148 is transmitted to the base station 104. The channel information 148 may include channel characteristics 202 determined by the signal forwarding device, retransmission of the UE reference signal (retransmitted UE reference signal 304), a SFD reference signal 306 and/or other information related to the UE-SFD channel 124 and/or the BS-SFD channel 122. Two exemplary methods are discussed below including a method where the channel information 148 includes reference signals 304, 306 and a method where the channel information 148 includes measured channel characteristics 202.

At step 606, a signal forwarding scheme instruction 144 is received from the base station 104. The signal forwarding scheme instruction 144 identifies the signal forwarding scheme that should be applied by the signal forwarding device 102.

At step 608, the signal forwarding device applies the signal forwarding scheme identified by the instruction to the incoming signal. As discussed above, the incoming signal may be the downlink incoming signal 114 from the base station 104 or may be the uplink incoming signal 116 from the UE device 106. The signal forwarding device 102 may forward signals in one or both directions.

Figure 7:
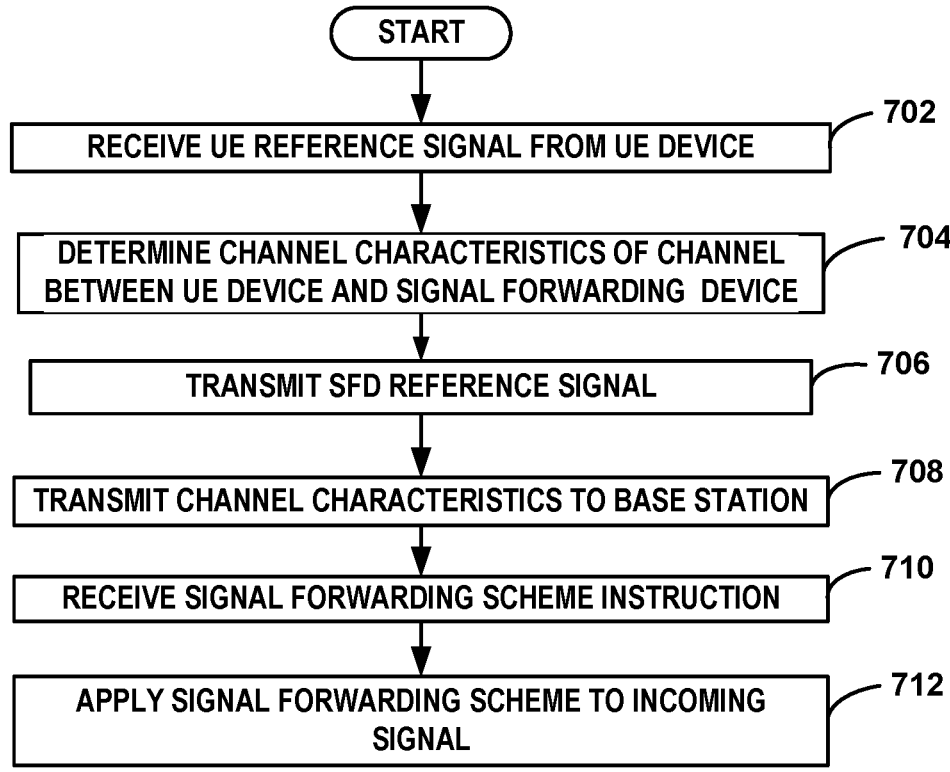
FIG. 7 is a flow chart of an example of a method of managing signal forwarding schemes at a signal forwarding device where the channel information includes channel characteristics determined by the signal forwarding device.

FIG. 7 is a flow chart of an example of a method of managing signal forwarding schemes at a signal forwarding device 102 where the channel information 148 includes channel characteristics 202 determined by the signal forwarding device 102.

At step 702, a UE reference signal 204 is received from the UE device 106. An example of a suitable UE reference signal 204 is a pilot signal. The reference signal 106 is received through the UE-SFD channel 124.

At step 704, channel characteristics of the UE-SFD channel 124 between the UE and the signal forwarding device 102 are determined. The signal forwarding device 102 receives the UE reference signal 204 and performs channel estimation to determine channel coefficients of the UE-SFD channel 124 for one example.

At step 706, an SFD reference signal 306, such as a pilot signal, is transmitted to the base station 104 through the BS-SFD channel 122.

At step 708, the channel characteristics 202 of the UE-SFD channel 124 are transmitted to the base station 104. In some situations, the channel characteristics 202 are transmitted as parameters or values. For example, the channel coefficients of the UE-SFD channel can be sent in message to the base station 104. In other situations, the channel characteristics 202 are sent as an indicator of the whether a particular threshold has been exceeded. For example, the channel characteristics 202 may include an indicator indicating whether the quality of the UE-SFD channel is above a threshold.

At step 710, a signal forwarding scheme instruction 144 is received from the base station 104. The signal forwarding scheme instruction 144 identifies the signal forwarding scheme that should be applied by the signal forwarding device 102.

At step 712, the signal forwarding device 102 applies the signal forwarding scheme identified by the instruction to the incoming signal. As discussed above, the incoming signal may be the downlink incoming signal 114 from the base station 104 or may be the uplink incoming signal 116 from the UE device 106. The signal forwarding device 102 may forward signals in one or both directions.

Figures 8, 9:
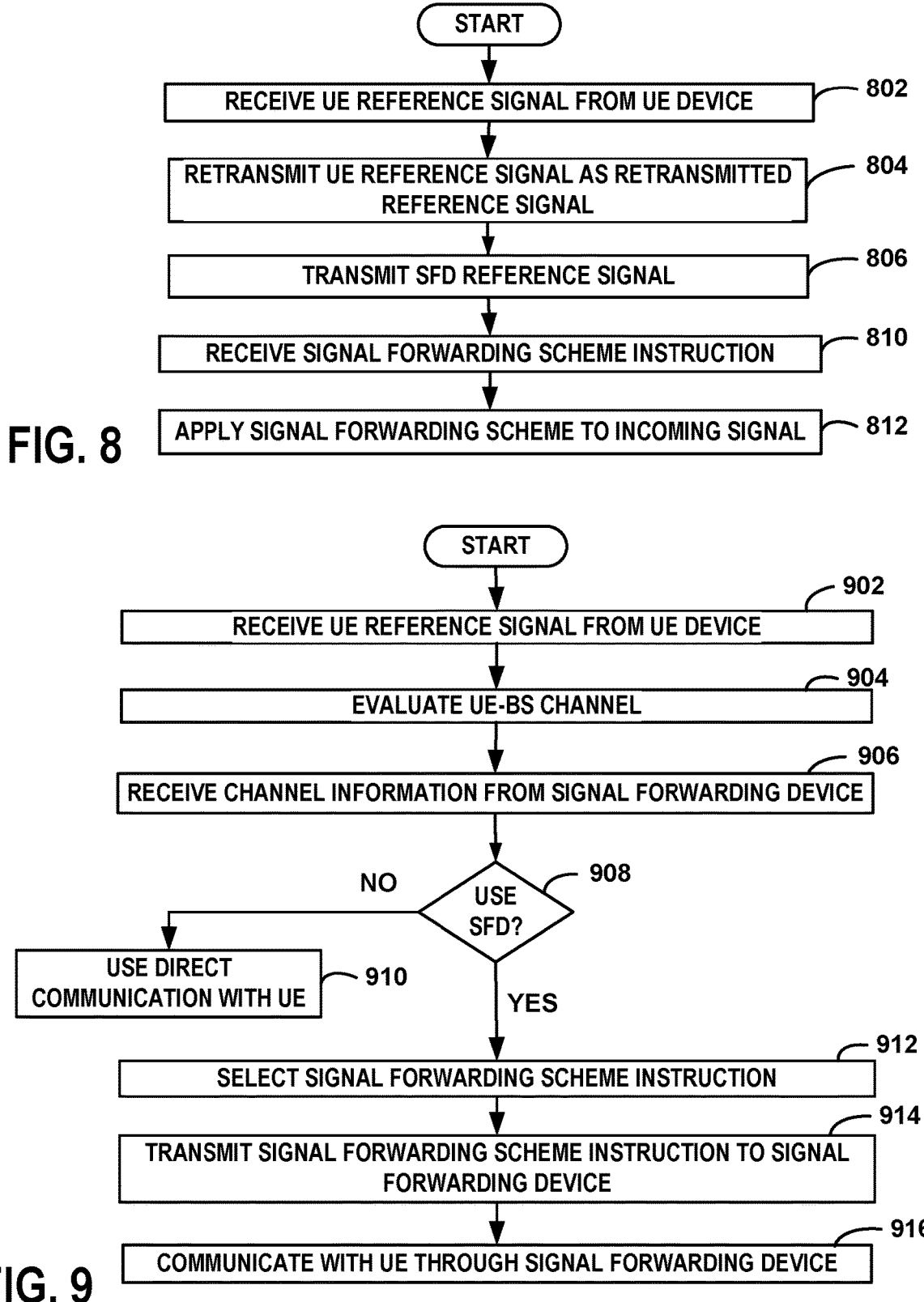
FIG. 8 is a flow chart of an example of a method of managing signal forwarding schemes at a signal forwarding device where the channel information includes a retransmitted UE reference signal.
FIG. 9 is a flow chart of an example of a method at a base station of managing signal forwarding schemes.

FIG. 8 is a flow chart of an example of a method of managing signal forwarding schemes at a signal forwarding device 102 where the channel information 148 includes a retransmitted UE reference signal 304.

At step 802, a UE reference signal 204 is received from the UE device 106. An example of a suitable UE reference signal 204 is a pilot signal. The reference signal 106 is received through the UE-SFD channel 124.

At step 804, the UE reference signal 204 is retransmitted as a retransmitted UE reference signal 304. For the example, the UE reference signal 204 is received, amplified and retransmitted with minimal or no processing.

At step 806, an SFD reference signal 306, such as a pilot signal, is transmitted to the base station 104 through the BS-SFD channel 122.

At step 808, a signal forwarding scheme instruction 144 is received from the base station 104. The signal forwarding scheme instruction 144 identifies the signal forwarding scheme that should be applied by the signal forwarding device 102.

At step 810, the signal forwarding device 102 applies the signal forwarding scheme identified by the instruction to the incoming signal. As discussed above, the incoming signal may be the downlink incoming signal 114 from the base station 104 or may be the uplink incoming signal 116 from the UE device 106. The signal forwarding device 102 may forward signals in one or both directions.

FIG. 9 is a flow chart of an example of a method at a base station of managing signal forwarding schemes.

At step 902, a UE reference signal 204 is received from the UE device 106 through the UE-BS channel 126.

At step 904, UE-BS channel 126 is evaluated. In one example, channel estimation is performed on the channel to determine channel coefficients and the gain of the channel. For example, the SNR or SNIR of the UE-BD channel 126 can be computed.

At step 906, channel information 148 is received from the signal forwarding device 102. The channel information 148 may include channel characteristics 202 determined by the signal forwarding device, retransmission of the UE reference signal (retransmitted UE reference signal 304), a SFD reference signal 306 and/or other information related to the UE-SFD channel 124 and/or the BS-SFD channel 122.

At step 908, it is determined whether the signal forwarding device 102 should be used for communication with the UE device 106. The base station 104 evaluates the channel information 148 and the channel evaluation of the UE-BS channel 126 and determines whether it is preferred to communicate directly with the UE device 106 or to communicate through the signal forwarding device 102. In one example, the base station uses the channel information to evaluate the UE-SFD channel 124 and the BS-SFD channel 144 and then compares the evaluations of the three channels 122, 124, 126 to determine whether the signal forwarding device should be used. If it is determined that the signal forwarding device should not be used, the method continues at step 910 where the base station communicates directly with the UE device 106 through the UE-BS channel 126. Otherwise, the method continues at step 912.

At step 912, the signal forwarding scheme to be used by the signal forwarding device 102 is selected. The scheduler 108 in cooperation with the base station 104 selects the signal forwarding scheme based at least on the channel information 144. In one example, channel evaluations of the three channels 122, 124, 126 are compared to select the signal forwarding scheme. In some situations, other information in addition to the channel information is used to select the signal forwarding scheme.

At step 914, a signal forwarding scheme instruction 144 is transmitted to the signal forwarding device. The signal forwarding scheme instruction indicates the selected signal forwarding device scheme.

At step 916, the base station communicates with the UE device 106 through the signal forwarding device 102. The signal forwarding device 102 applies the signal forwarding scheme identified by the instruction to the incoming signal. As discussed above, the incoming signal may be the downlink incoming signal 114 from the base station 104 or may be the uplink incoming signal 116 from the UE device 106. The signal forwarding device 102 may forward signals in one or both directions.

Figure 10:
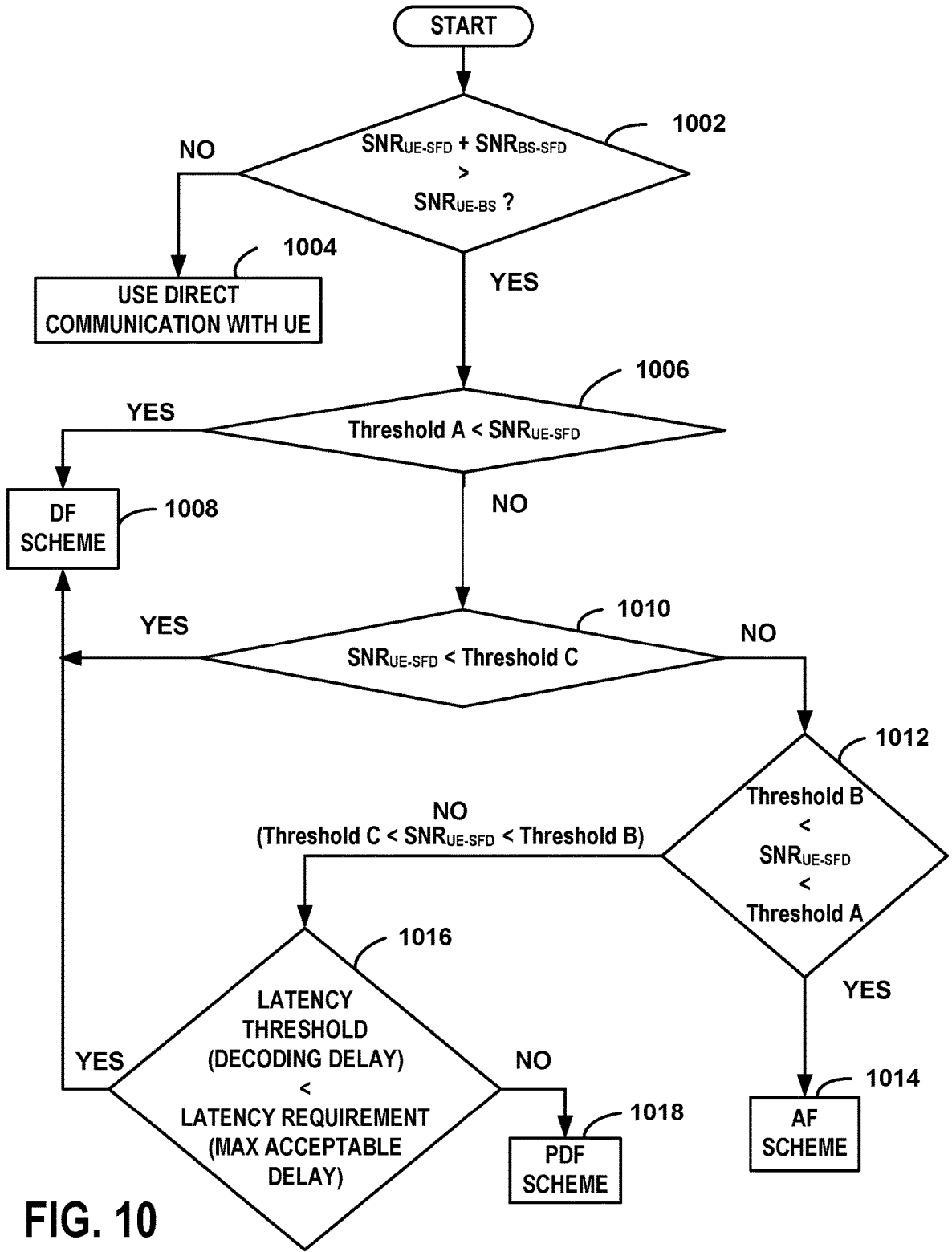
FIG. 10 is a flow chart of an example for performing steps 908 through 912 of FIG. 9.

FIG. 10 is a flow chart of an example for performing steps 908 through 912 of FIG. 9. The example of FIG. 10 is one of numerous techniques that can be used to select the signal forwarding scheme. The technique includes comparing the SNR of the UE-SFD channel to three thresholds including Threshold A, Threshold B and Threshold C, where Threshold A is greater than Threshold B and Threshold B is greater than Threshold C.

At step 1002, it is determined whether the combined SNR of the UE-SFD channel and the BS-SFD channel is greater than the SNR of the UE-BS channel. If the combined SNR is not greater than the UE-BS channel SNR, the method continues at step 1004 where the bases station communicates directly with the UE device 106 through the UE-BS channel and the signal forwarding device is not used. If the combined SNR is greater than the UE-BS channel SNR, the method continues at step 1006.

At step 1006, it is determined whether the SNR of the UE-SFD channel is greater than Threshold A. If the SNR is greater than the threshold, the method continues at step 1008 where the DF signal forwarding scheme is selected. Otherwise, the method continues at step 1010.

At step 1010, it is determined whether the SNR of the UE-SFD channel is less than Threshold C. If the SNR is less than the threshold, the method continues at step 1008 where the DF signal forwarding scheme is selected. Otherwise, the method continues at step 1012.

At step 1012, it is determined whether the SNR of the UE-SFD channel is less than Threshold A but greater than Threshold B. If the SNR is the range, the method continues at step 1014 where the AF signal forwarding scheme is selected. Otherwise, the method continues at step 1016.

For the example, step 1016 is reached when the SNR of the UE-SFD channel is greater than Threshold C and less than Threshold B. At step 1016, it is determined whether the required maximum latency of the transmission is greater than a latency threshold. If the decoding delay resulting from a full decode and forward (DF) signal forwarding scheme is less than the delay that can be tolerated for the transmission, it is determined that the latency requirement is greater than the latency threshold and the method continues at step 1008. Otherwise, the method proceeds to step 1018 where the PDF signal forwarding scheme is selected. Therefore, where the decoding delay is less than the maximum tolerable delay for the transmission, the DF signal forwarding scheme is selected. Where the decoding delay is greater than the maximum tolerable delay for the transmission, the PDF signal forwarding scheme is selected.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:

receiving, at a repeater from a base station via a wireless backhaul link, a downlink signal including data;

receiving, at the repeater from the base station via a control link, control information controlling a signal forwarding scheme utilized by the repeater; and transmitting, from the repeater to a user equipment (UE) device, a forwarded signal based on the downlink signal and the control information, wherein the control information includes first control information and second control information, the first control information controlling a first signal forwarding scheme utilized by the repeater to transmit the forwarded signal from the repeater to the UE device, the second control information controlling a second signal forwarding scheme utilized by the repeater to transmit another forwarded signal from the repeater to the base station, the another forwarded signal based on an uplink signal received at the repeater from the UE device.

2. A repeater comprising:

a receiver configured to:

receive, via a wireless backhaul link, a downlink signal including data from a base station, and receive, via a control link, control information from the base station, the control information controlling a signal forwarding scheme utilized by the repeater; and a transmitter configured to transmit, to a user equipment (UE) device, a forwarded signal based on the downlink signal and the control information, wherein the control information includes first control information and second control information, the first control information controlling a first signal forwarding scheme utilized by the repeater to transmit the forwarded signal from the repeater to the UE device, the second control information controlling a second signal forwarding scheme utilized by the repeater to transmit another forwarded signal from the repeater to the base station, the another forwarded signal based on an uplink signal received at the repeater from the UE device.

3. The repeater of claim 2, wherein the signal forwarding scheme utilized by the repeater is an amplify and forward (AF) forwarding scheme.

4. The repeater of claim 2, wherein the control information is received over a Physical Downlink Control Channel (PDCCH).

5. The repeater of claim 2, wherein the first signal forwarding scheme is different from the second signal forwarding scheme.

6. An apparatus for controlling a repeater, the apparatus comprising a processor and a memory, the processor configured to:

receive, via a wireless backhaul link, a downlink signal including data from a base station;

receive, via a control link, control information from the base station, the control information controlling a signal forwarding scheme utilized by the repeater; and transmit, to a user equipment (UE) device, a forwarded signal based on the downlink signal and the control information, wherein the control information includes first control information and second control information, the first control information controlling a first signal forwarding scheme utilized by the repeater to transmit the forwarded signal from the repeater to the UE device, the second control information controlling a second signal forwarding scheme utilized by the repeater to transmit another forwarded signal from the repeater to the base station, the another forwarded signal based on an uplink signal received at the repeater from the UE device.

7. The apparatus of claim 6, wherein the signal forwarding scheme utilized by the repeater is an amplify and forward (AF) forwarding scheme.

8. The apparatus of claim 6, wherein the control information is received over a Physical Downlink Control Channel (PDCCH).

9. The apparatus of claim 6, wherein the first signal forwarding scheme is different from the second signal forwarding scheme.

* * * * *